UNITED STATES PATENT OFFICE.

LAURENCE F. J. WRINKLE, OF VIRGINIA CITY, NEVADA.

PROCESS OF TREATING NATIVE SODA.

SPECIFICATION forming part of Letters Patent No. 387,613, dated August 7, 1888.

Application filed March 11, 1887. Serial No. 230,532. (Specimens.)

*To all whom it may concern:*

Be it known that I, LAURENCE F. J. WRINKLE, of Virginia City, in the county of Storey and State of Nevada, have invented a new and useful Improvement in the Treatment of Natural Soda, of which the following is a full, clear, and exact description.

My invention relates to the treatment of crude natural soda produced from alkaline lakes, which is a crystalline substance consisting of normal carbonate and acid carbonate of soda in varying proportions, with the chlorides and sulphates of potash and soda as common impurities. An ordinary process of treating such crude soda is first to heat it in a furnace to redness until the excess of carbonic acid is driven off and the normal carbonate ($Na_2CO_3$) remains behind, more or less contaminated with sand from the clay-ponds, in which such soda is produced by solar evaporation of the alkaline-lake water, and still further contaminated with all the common salt and sulphate of soda and potash precipitated on evaporation along with the crude soda.

My invention consists in a very different and novel process, substantially as hereinafter described, and pointed out in the claim, of treating the crude soda, whereby the imperfect results under the above-described process are avoided and much more perfect results obtained—that is to say, whereby I am enabled to save the bicarbonate in place of converting it, as in the process hereinbefore described, into the normal carbonate, which is very much less valuable than the bicarbonate, also whereby the crystal soda is obtained free from sand and to a much larger extent from salt and sulphate, and likewise whereby the treatment of the natural soda is made at a less expense.

To describe in detail my improved process: I first wash the natural or crude soda with a small quantity of cold fresh water, after breaking it in small pieces, which removes much salt and sulphate. Then I treat the natural or crude soda with hot fresh water until a saturated or nearly-saturated solution is produced. To do this I find that the temperature of the water, while it may approach, should not exceed 150° Fahrenheit, or thereabout. I then clear the liquid by allowing it to settle a short time, and afterward strain it through cotton cloth or otherwise and run it into suitable vessels to cool, the straining taking place while the solution or liquid is at the same temperature, or thereabout—say 150° Fahrenheit—as adopted for making the saturated solution of the crude soda. As the liquid cools, the acid carbonate of soda, commonly known as "bicarbonate," ($NaHCO_3$,) crystallizes out first. After the solution has thus been partially cooled and the bicarbonate allowed to deposit, the solution is run off into another vessel or vessels, in which, on further cooling, the crystals of the normal carbonate, commonly known as "sal-soda," are deposited. Finally the bicarbonate thus obtained is freed from mother-liquor in any suitable way and dried in the usual manner.

Having thus fully described my invention, I claim as new and desire to secure by Letters Patent—

In the within-described process of treating natural soda, first making a saturated or approximately saturated solution of the natural or crude soda in hot fresh water, then clearing the solution by allowing it to settle, then straining it while hot and allowing it to partially cool in a separate vessel or vessels and to crystallize therein, afterward running it off into another vessel or vessels and allowing it to further cool and again crystallize, and finally freeing the separated bicarbonate of soda from mother-liquor and drying it, essentially as herein described.

LAURENCE F. J. WRINKLE.

Witnesses:
 L. M. COFFIN,
 P. E. SHANNON.